(12) United States Patent
Morishima et al.

(10) Patent No.: US 7,858,234 B2
(45) Date of Patent: Dec. 28, 2010

(54) NONAQUEOUS ELECTROLYTE BATTERY AND BATTERY PACK

(75) Inventors: Hideaki Morishima, Ichikawa (JP); Hiroki Inagaki, Kawasaki (JP); Hidesato Saruwatari, Kawasaki (JP); Shinsuke Matsuno, Kashiwa (JP); Yumi Fujita, Yokohama (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 255 days.

(21) Appl. No.: 11/531,142

(22) Filed: Sep. 12, 2006

(65) Prior Publication Data

US 2007/0059602 A1    Mar. 15, 2007

(30) Foreign Application Priority Data

Sep. 15, 2005    (JP) .............................. 2005-268981

(51) Int. Cl.
*H01M 4/36* (2006.01)
*H01M 4/38* (2006.01)
*H01M 4/00* (2006.01)
*H01M 4/50* (2006.01)
*H01M 4/505* (2006.01)
*H01M 4/58* (2006.01)

(52) U.S. Cl. ........................ 429/226; 429/223; 429/224; 429/231.6; 429/231.9; 429/231.95

(58) Field of Classification Search ............... 429/122, 429/149–152, 156, 218.1, 218.2, 220–221, 429/223–224, 231.1, 231.5, 231.3, 231.9–231.95; 423/304–306, 311–312, 592.1–594.5, 598–600, 423/594.8, 594.15; 252/182.1; 29/623.1–623.5
See application file for complete search history.

(56) References Cited

U.S. PATENT DOCUMENTS

| | | | |
|---|---|---|---|
| 6,316,145 B1 * | 11/2001 | Kida et al. ............... | 429/231.5 |
| 6,835,500 B2 * | 12/2004 | Masquelier et al. .... | 429/231.95 |
| 6,984,470 B2 | 1/2006 | Morishima et al. | |
| 2002/0192137 A1 * | 12/2002 | Chaloner-Gill et al. ..... | 423/306 |
| 2003/0059684 A1 * | 3/2003 | Takami et al. ............... | 429/326 |
| 2003/0064287 A1 * | 4/2003 | Masquelier et al. ......... | 429/221 |
| 2004/0048157 A1 * | 3/2004 | Neudecker et al. ....... | 429/231.2 |
| 2004/0072078 A1 * | 4/2004 | Fukuzawa et al. ........... | 429/233 |

(Continued)

FOREIGN PATENT DOCUMENTS

JP    2002-279989    9/2002

(Continued)

OTHER PUBLICATIONS

Olivine Structure, (Feb. 21, 2002; http://www.uwgb.edu/dutchs/PETROLGY/Olivine-Structure.htm).*

(Continued)

*Primary Examiner*—Raymond Alejandro
*Assistant Examiner*—Claire L Rademaker
(74) *Attorney, Agent, or Firm*—Oblon, Spivak, McClelland, Maier & Neustadt, L.L.P.

(57) ABSTRACT

A nonaqueous electrolyte battery includes a negative electrode containing a titanium-containing oxide, a positive electrode, and a nonaqueous electrolyte. The positive electrode includes a lithium-transition metal composite oxide and at least one kind of oxide selected from a group consisting of $FePO_4$, $Li_3Fe_2(PO_4)_3$, $LiFeP_2O_7$, $Fe_4(P_2O_7)_3$, $Fe_2(SO_4)_3$, and $V_2O_5$.

9 Claims, 5 Drawing Sheets

U.S. PATENT DOCUMENTS

| | | |
|---|---|---|
| 2004/0096743 A1 | 5/2004 | Okae et al. |
| 2005/0064282 A1 | 3/2005 | Inagaki et al. |
| 2005/0069777 A1 | 3/2005 | Takami et al. |
| 2005/0112054 A1* | 5/2005 | Eberman et al. .......... 423/594.4 |
| 2005/0196673 A1* | 9/2005 | Biensan et al. ........... 429/231.1 |
| 2005/0221173 A1 | 10/2005 | Tatebayashi et al. |
| 2005/0221187 A1 | 10/2005 | Inagaki et al. |
| 2005/0221188 A1 | 10/2005 | Takami et al. |
| 2006/0029865 A1 | 2/2006 | Morishima et al. |
| 2006/0046155 A1 | 3/2006 | Inagaki et al. |
| 2006/0068272 A1 | 3/2006 | Takami et al. |
| 2006/0134520 A1 | 6/2006 | Ishii et al. |
| 2007/0003838 A1* | 1/2007 | Kumashiro et al. ......... 429/324 |
| 2008/0070115 A1 | 3/2008 | Saruwatari et al. |

FOREIGN PATENT DOCUMENTS

| | | |
|---|---|---|
| JP | 2008-519399 | 6/2008 |

OTHER PUBLICATIONS

Yao et al, Journal of Alloys and Compounds, 465 (2008) 375-379.
U.S. Appl. No. 12/428,803, filed Apr. 23, 2009, Matsuno, et al.
U.S. Appl. No. 12/512,540, filed Jul. 30, 2009, Inagaki, et al.

* cited by examiner

NONAQUEOUS ELECTROLYTE BATTERY AND BATTERY PACK

CROSS-REFERENCE TO RELATED APPLICATIONS

This application is based upon and claims the benefit of priority from prior Japanese Patent Application No. 2005-268981, filed Sep. 15, 2005, the entire contents of which are incorporated herein by reference.

BACKGROUND OF THE INVENTION

1. Field of the Invention

The present invention relates to a nonaqueous electrolyte battery, a battery pack, a positive electrode, and a vehicle.

2. Description of the Related Art

A nonaqueous electrolyte battery in which the charging and the discharging operations are performed through migration of lithium ions between the negative electrode and the positive electrode, has been researched and developed as a high energy density battery. Lithium ions migrate from the positive electrode to the negative electrode in the charging operation, and from the negative electrode to the positive electrode in the discharging operation. A positive electrode active material mainly serves as a lithium source of lithium ions, which contribute to the charging/discharging operation.

A nonaqueous electrolyte battery has been commercialized in which lithium-transition metal composite oxide is used for the positive electrode active material, and carbonaceous material is used for the negative electrode active material. It is a common practice that Co, Mn, Ni or the like is used for a transitional metal component of the lithium-transition metal composite oxide.

In the case of the nonaqueous electrolyte battery, the initial charge/discharge efficiency of the negative electrode is lower than that of the positive electrode. Accordingly, in the initial charging/discharging cycle, the available electric capacity of the negative electrode is more greatly reduced than that of the positive electrode. In other words, the available electric capacity of the negative electrode is smaller than that of the positive electrode. As a result, as shown in FIG. 7, the negative electrode potential ascends to reach the discharge cutoff voltage of the battery. In other words, the discharge cutoff voltage of the battery depends on a variation of the negative electrode potential.

Recently, a nonaqueous electrolyte battery in which a titanium containing oxide is used for the negative electrode active material is attracting attention.

There is an approach that two or more kinds of active materials are used for the positive electrode. JP-A 2002-279989(KOKAI), for example, discloses a technique in which a mixture of phosphorus oxide, e.g., $LiFePO_4$, and oxide, e.g., $LiCoO_2$, is used for the positive electrode active material.

BRIEF SUMMARY OF THE INVENTION

According to one aspect of the present invention, there is provided a nonaqueous electrolyte battery comprising:
a negative electrode containing a titanium-containing oxide;
a positive electrode containing a lithium-transition metal composite oxide and at least one kind of oxide selected from a group consisting of $FePO_4$, $Li_3Fe_2(PO_4)_3$, $LiFeP_2O_7$, $Fe_4(P_2O_7)_3$, $Fe_2(SO_4)_3$, and $V_2O_5$; and
a nonaqueous electrolyte.

According to another aspect of the present invention, there is provided a battery pack comprising nonaqueous electrolyte batteries, wherein
the nonaqueous electrolyte batteries comprise:
a negative electrode containing a titanium-containing oxide;
a positive electrode containing a lithium-transition metal composite oxide and at least one kind of oxide selected from a group consisting of $FePO_4$, $Li_3Fe_2(PO_4)_3$, $LiFeP_2O_7$, $Fe_4(P_2O_7)_3$, $Fe_2(SO_4)_3$, and $V_2O_5$; and
a nonaqueous electrolyte.

According to another aspect of the present invention, there is provided a vehicle comprising a battery pack comprising nonaqueous electrolyte batteries, wherein
the nonaqueous electrolyte batteries comprise:
a negative electrode containing a titanium-containing oxide;
a positive electrode containing a lithium-transition metal composite oxide and at least one kind of oxide selected from a group consisting of $FePO_4$, $Li_3Fe_2(PO_4)_3$, $LiFeP_2O_7$, $Fe_4(P_2O_7)_3$, $Fe_2(SO_4)_3$, and $V_2O_5$; and
a nonaqueous electrolyte.

According to another aspect of the present invention, there is provided a positive electrode including:
a lithium-transition metal composite oxide; and
at least one kind of oxide selected from a group consisting of $FePO_4$, $Li_3Fe_2(PO_4)_3$, $LiFeP_2O_7$, $Fe_4(P_2O_7)_3$, $Fe_2(SO_4)_3$, and $V_2O_5$.

DETAILED DESCRIPTION OF THE INVENTION

The inventor of the present invention has made research on a nonaqueous electrolyte battery in which lithium-transition metal composite oxide is used for the positive electrode active material, and titanium-containing oxide is used for the negative electrode active material, and found the problem given below. The problem arises from the fact that initial charge/discharge efficiency of titanium-containing oxide is higher than that of carbonaceous material, and is equal to or higher than that of the positive electrode active material.

In the initial charging/discharging cycle, because of such initial charge/discharge efficiency difference, the available electric capacity of the positive electrode is more greatly reduced than that of the negative electrode. In other words, the available electric capacity of the positive electrode is smaller than that of the negative electrode.

Figure 8:
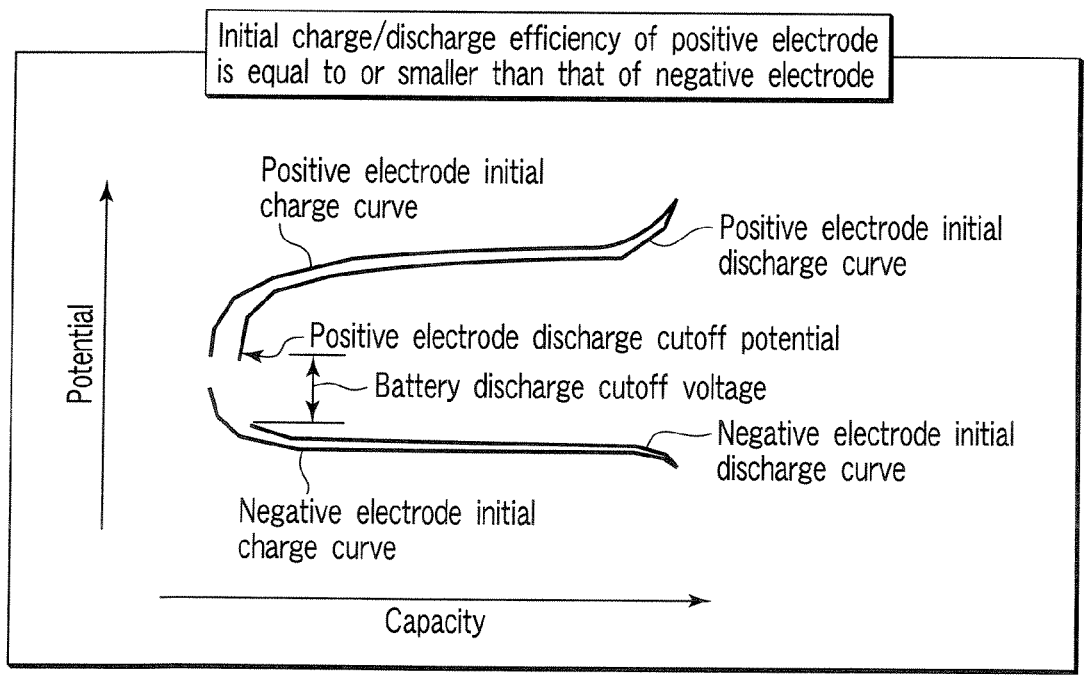
FIG. 8 is a graph showing an initial charge/discharge curve when an initial charge/discharge efficiency of the positive electrode is equal to or smaller than that of the negative electrode.

As a result, as shown in FIG. 8, the positive electrode potential descends to reach the discharge cutoff voltage. In other words, a battery voltage in the end stage of the discharging operation varies depending on a variation of the positive electrode potential, and consequently the battery voltage reaches the discharge cutoff voltage. The positive electrode potential that will define the discharge cutoff voltage descends to be excessively low, and an irreversible change occurs in a crystal structure of the lithium-transition metal composite oxide, and the cycle performance of the battery degrades.

Embodiments will be described with reference to the accompanying drawings. Throughout the embodiments, like reference symbols are used to designate like or equivalent parts and portions, for simplicity of description. The drawings are model views useful for better understanding of the present invention. The drawings contain some portions where configurations, dimensions, ratios, and others are different from the corresponding ones in an actual apparatus. Those may be appropriately altered in design by taking into consideration the description to follow, and known technologies.

An outline of the embodiments will first be described.

A nonaqueous electrolyte battery includes a negative electrode containing titanium-containing oxide and a positive electrode. The positive electrode includes a first positive electrode active material essentially consisting of a lithium-transition metal composite oxide and a second positive electrode active material essentially consisting of at least one kind of oxide selected from a group consisting of $FePO_4$, $Li_3Fe_2(PO_4)_3$, $LiFeP_2O_7$, $Fe_4(P_2O_7)_3$, $Fe_2(SO_4)_3$, and $V_2O_5$. Those compositions, $FePO_4$, $Li_3Fe_2(PO_4)_3$, $LiFeP_2O_7$, $Fe_4(P_2O_7)_3$, $Fe_2(SO_4)_3$, and $V_2O_5$, are those when the battery is being charged. Three lithium atoms contained in $Li_3Fe_2(PO_4)_3$ are not involved in the charging/discharging operation, and do not migrate to the negative electrode by the charging operation. $Li_3Fe_2(PO_4)_3$ intercalates lithium that is desorbed from the negative electrode at the time of discharging to transform into $Li_{3+x}Fe_2(PO_4)_3$ (x>0). The lithium that $Li_3Fe_2(PO_4)_3$ has newly intercalated is involved in the charging/discharging operation. Also, a lithium atom contained in $LiFeP_2O_7$ are not involved in the charging/discharging operation, and do not migrate to the negative electrode by the charging operation. $LiFeP_2O_7$ intercalates lithium that is desorbed from the negative electrode at the time of discharging to transform into $Li_{1+x}FeP_2O_7$ (x>0). The lithium that $LiFeP_2O_7$ has newly intercalated is involved in the charging/discharging operation. $FePO_4$, $Fe_4(P_2O_7)_3$, $Fe_2(SO_4)_3$, and $V_2O_5$ also intercalate lithium, and the lithium intercalated is involved in the charging/discharging operation. Even if the compositions of the second negative electrode active material are $FePO_4$, $Li_3Fe_2(PO_4)_3$, $LiFeP_2O_7$, $Fe_4(P_2O_7)_3$, $Fe_2(SO_4)_3$ or $V_2O_5$ at the time of forming the positive electrode, the compositions of the second positive electrode active material contained in the nonaqueous electrolyte battery when the battery is being used are sometimes different from the former. In order to obtain sufficient cycle performance, the composition of the second positive electrode active material before the first charging operation is performed after the nonaqueous electrolyte battery is manufactured, is desirably $FePO_4$, $Li_3Fe_2(PO_4)_3$, $LiFeP_2O_7$, $Fe_4(P_2O_7)_3$, $Fe_2(SO_4)_3$, or $V_2O_5$.

The first positive electrode active material contains a lithium source involved in the charging/discharging operation, and reversibly desorbs and absorbs lithium in the first charging/discharging cycle and the subsequent ones. $LiCoO_2$ desorbs lithium in the charging operation to become $Li_{0.5}CoO_2$. In the discharging operation, it absorbs the lithium that is desorbed from the negative electrode to transform into $Li_xCoO_2$ ($0.5 \leq x \leq 1$). The second positive electrode active material has no lithium source being involved in the charging/discharging operation. Thus, it does not desorb lithium in the first charging operation, and intercalates lithium in the first discharging operation. In charging/discharging cycles following this first discharging operation, the second negative electrode active material reversibly deintercalates and intercalates lithium.

Figure 7:
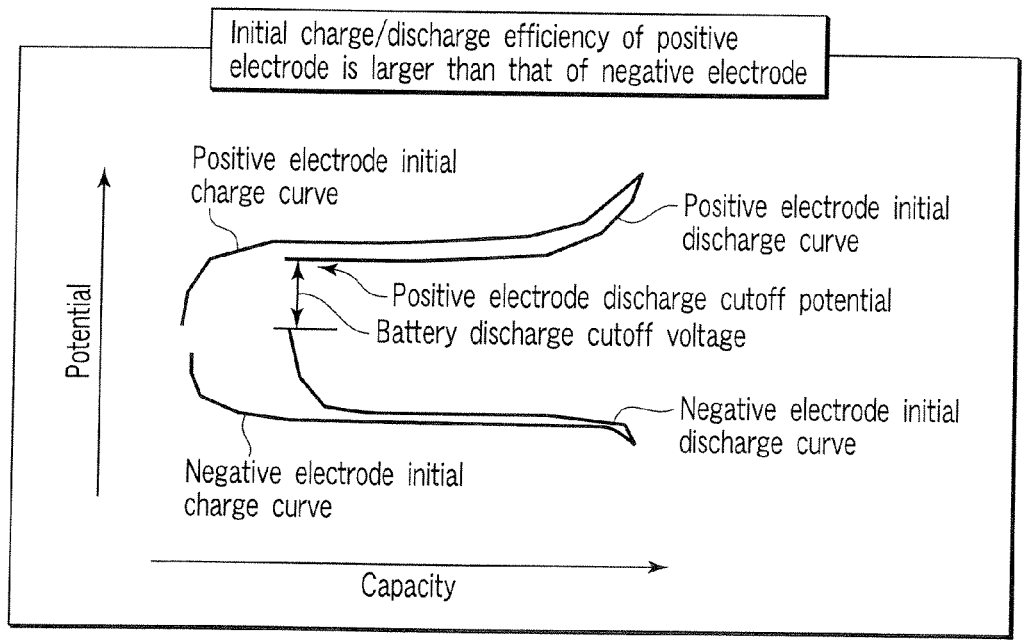
FIG. 7 is a graph showing an initial charge/discharge curve when an initial charge/discharge efficiency of the positive electrode is larger than that of the negative electrode.

By using two kinds of the positive electrode active materials, an amount of desorbing lithium of the positive electrode in the first charging operation is small, while an amount of absorbing lithium of the positive electrode is large in the first discharging operation. That is, the initial charge/discharge efficiency of the positive electrode is increased. As a result, even if the negative electrode having high initial charge/discharge efficiency is used, it is ensured to take an appropriate balance between the available electric capacity of the negative electrode and that of the positive electrode. The discharging operation will end based on a variation of the negative electrode potential (see FIG. 7). To be more exact, as shown in FIG. 7, the initial charge/discharge efficiency of the positive electrode is higher than that of the negative electrode. Accordingly, in the discharging operation, a negative electrode reaction (lithium desorbing reaction) terminates earlier than a positive electrode reaction (lithium absorbing reaction). As a result, a negative electrode initial discharge curve sharply rises, while in a positive electrode initial discharge curve, there is observed no sharp variation. Accordingly, ascending of the negative electrode potential leads to the discharge cutoff voltage of the battery.

As shown in FIG. 7, in the first charging operation, the lithium contained into the first positive electrode active material are desorbed from the positive electrode and absorbed into the negative electrode. In the first discharging operation, the initial charge/discharge efficiency of the positive electrode is higher than that of the negative electrode. Accordingly, in the first discharging operation, a negative electrode reaction (lithium desorbing reaction) terminates earlier than a positive electrode reaction (lithium absorbing reaction). As a result, in the first discharging operation, the lithium desorbed from the negative electrode is intercalated into the first positive electrode active material and the second positive electrode active material.

In the second charging operation, the lithium intercalated into the first positive electrode active material and the second positive electrode active material are desorbed from the positive electrode and absorbed into the negative electrode. In the second discharging operation, the lithium desorbed from the negative electrode is intercalated into the first positive electrode active material and the second positive electrode active material. Therefore, in the discharging operation, the negative electrode reaction terminates earlier than the positive electrode reaction, and the negative electrode potential ascends to reach the discharge cutoff voltage. Also in the third and subsequent charging/discharging operations, the reactions like those in the second charging/discharging operation occur. Accordingly, the negative electrode potential varies to reach the discharge cutoff voltage.

$LiFePO_4$ having an olivine structure described in JP-A 2002-279989(KOKAI) has a lithium source being involved in the charging/discharging operation, and reversibly desorbs and absorbs lithium in the first charging/discharging cycle and the subsequent ones. Therefore, $LiFePO_4$ does not function as the above-described second positive electrode active material, and thus cannot increase the initial charge/discharge efficiency of the positive electrode.

The nonaqueous electrolyte battery will be described in a first embodiment, and the battery pack will be described in a second embodiment.

First Embodiment

A structure of a unit cell according to a first embodiment will be described with reference to FIGS. 1 and 2.

Figure 1:
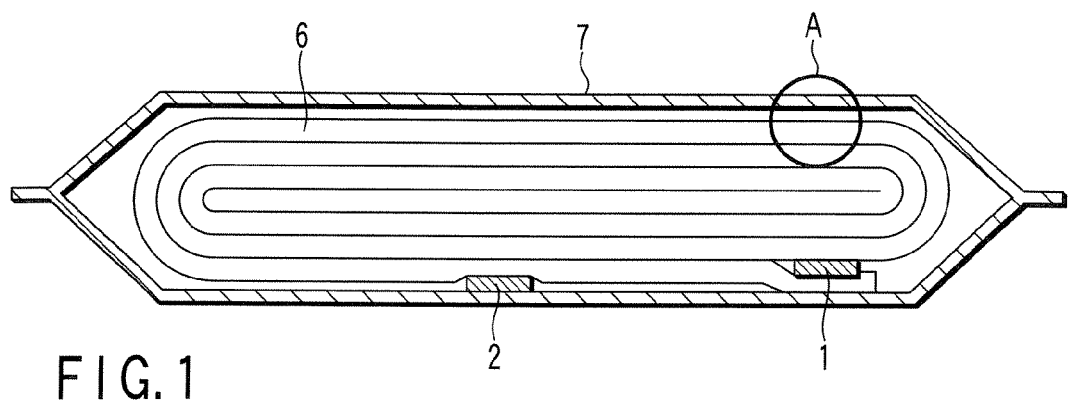
FIG. 1 is a cross sectional view showing in model form a flat type nonaqueous electrolyte secondary battery according to a first embodiment.

As shown in FIG. 1, a wound electrode group 6 of electrodes being spirally wound and flat in shape is housed in a case 7. The wound electrode group 6 has a structure that a separator 5, a positive electrode 3, and a negative electrode 4 are spirally wound in a state that the separator 5 is located between the positive and the negative electrode 3 and 4, thereby to form a flat configuration. The nonaqueous electrolyte is retained in the wound electrode group 6.

Figure 2:
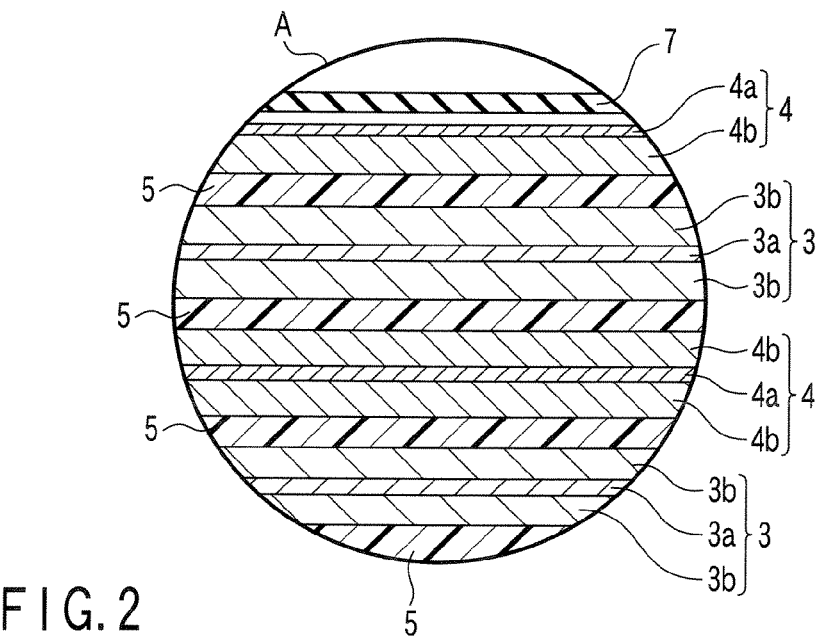
FIG. 2 is a partial cross sectional view showing a portion A enclosed by a circle in FIG. 1.

As shown in FIG. 2, the negative electrode 4 is located on the outermost periphery of the wound electrode group 6. The separator 5, the positive electrode 3, the separator 5, the negative electrode 4, the separator 5, the positive electrode 3, and the separator 5 are located within the negative electrode 4. Thus, the positive electrode 3 and the negative electrode 4 are alternately layered in a state that the separator 5 is interposed between the electrodes. The negative electrode 4 includes a negative electrode current collector 4a and a negative electrode active material-containing layer 4b supported on the negative electrode current collector 4a. In a part of the negative electrode 4, which extends along the outermost periphery of the electrode group, the negative electrode active material-containing layer 4b is formed on only one side of the negative electrode current collector 4a. The positive electrode 3 includes a positive electrode current collector 3a, and a positive electrode active material-containing layer 3b supported on the positive electrode current collector 3a.

As shown in FIG. 1, a strip-like positive electrode terminal 1 is electrically connected to the positive electrode current collector 3a located near the outermost periphery of the wound electrode group 6. A strip-like negative electrode terminal 2 is electrically connected to the negative electrode current collector 4a located near the outermost periphery of the wound electrode group 6. The leading ends of the positive electrode terminal 1 and the negative electrode terminal 2 are led out outside from the same edge of the case 7.

The positive electrode, the negative electrode, the nonaqueous electrolyte, the separator, and the case will be described in detail.

1) Positive Electrode

The positive electrode includes a positive electrode current collector, and a positive electrode active material-containing layer which is supported on one side or both sides of the positive electrode current collector, and which contains positive electrode active material, positive electrode conductive agent, and binder.

The positive electrode active material contains a first positive electrode active material essentially consisting of a lithium-transition metal composite oxide, and a second positive electrode active material essentially consisting of at least one kind of oxide selected from a group consisting of $FePO_4$, $Li_3Fe_2(PO_4)_3$, $LiFeP_2O_7$, $Fe_4(P_2O_7)_3$, $Fe_2(SO_4)_3$, and $V_2O_5$.

The lithium-transition metal composite oxide is preferably one oxide selected from a group consisting of lithium cobalt composite oxide, lithium nickel composite oxide and lithium manganese composite oxide. The reason why those oxides are used is that an average operation voltage is high in the charging/discharging operation.

One or two kinds of the lithium-transition metal composite oxide may be used.

Examples of lithium-transition metal composite oxide are lithium cobalt oxide, e.g., $LiCoO_2$, lithium manganese composite oxide, e.g., $LiMn_2O_4$ or $LiMnO_2$, lithium nickel composite oxide, e.g., $LiNiO_2$, lithium nickel cobalt composite oxide, e.g., $Li_xNi_{1-y}Co_yO_2$, lithium manganese cobalt composite oxide, e.g., $Li_xMn_yCo_{1-y}O_2$, and lithium manganese nickel composite oxide having a spinel structure, e.g., $LiMn_{2-y}Ni_yO_4$. x and y are preferably each within a range from 0 to 1.

Preferable lithium-transition metal composite oxides are $LiCoO_2$, $LiNi_{1-x}M_xO_2$ (M: at least one of Co and Al, $0<X\leq0.3$), $LiNi_aCo_bMn_cO_2$ ($0.3<a<1$, $0\leq b<1$, $0.3<c<1$), and $Li_{1+Y}Mn_{2-Y-Z}M'_ZO_4$ (M'=at least one of Co, Ni, Fe, Al and Mg, $0<Y<0.1$, $0<Z<0.1$).

More preferable lithium-transition metal composite oxide is either $LiNi_{1-x}M_xO_2$ (M: at least one of Co and Al, $0<X\leq0.3$) or $LiNi_aCo_bMn_cO_2$ ($0.3<a<1$, $0\leq b<1$, $0.3<c<1$). The reason for this is that the initial charge/discharge efficiency of each of those oxides is relatively low and hence, the effect of the embodiment is noticeable.

Of the second positive electrode active materials enumerated above, $FePO_4$ is most preferable. $FePO_4$ is preferably amorphous or of the hexagonal type. The amorphous $FePO_4$ is superior to the hexagonal type $FePO_4$ in a discharge load performance and hence, is more preferable.

The amorphous $FePO_4$ may be synthesised by heating iron phosphates hydrate at temperature lower than 500° C. to dehydrate it. In this case, at 200° C. or lower, it is insufficiently dehydrated, and at 300° C. or higher, it is sufficiently dehydrated. Accordingly, it is heated preferably at 300° C. or higher to lower than 500° C. The hexagonal type $FePO_4$ may be synthesized by heating the iron phosphates hydrate at 500° C. or higher. At 700° C. or higher, however, an impurity phase is generated and hence, it is heated preferably at 500° C. or higher to lower than 700° C.

In powder X-ray diffraction measurement, the amorphous $FePO_4$ has no characteristic X-ray peak. When the hexagonal type $FePO_4$ is subjected to powder X-ray diffraction measurement where Kα-ray of Cu is used as a radiation source, the most intensive X-ray peak appears at 26°±2° of 2θ, and the next intensive X-ray peak appears at 21°±2° of 2θ.

A ratio of the second positive electrode active material to the first positive electrode active material is preferably in the range of 0.1 to 10 wt %.

Where it is 0.1 wt % or more, the effect by the second positive electrode active material is noticeable. Where it is 10 wt % or less, the number of lithium ions contributing to the charging/discharging operation is secured, and the discharge capacity is secured.

A more preferable ratio of the second positive electrode active material to the first positive electrode active material is in the range of 1 to 10 wt %, and a much more preferable ratio is within the range of 1 to 5 wt %.

The positive electrode conductive agent enhances the current collecting performance, and reduces contact resistance between the active material and the current collector. Examples of such are carbonaceous materials such as acetylene black, carbon black, and graphite.

The binder is able to bind the positive electrode active material with the positive electrode conductive agent. Examples of the binder are polytetrafluoroethylene (PTFE), polyvinylidene fluoride (PVdF), and fluorine-based rubber.

The mixing ratios of the positive electrode active material, the positive electrode conductive agent, and the binder are preferably 80 wt % or more to 95 wt % or less, 3 wt % or more to 18 wt % or less, and 2 wt % or more to 17 wt % or less, respectively. When the mixing ratio of the positive electrode conductive agent is set at 3 wt % or more, the effect mentioned above is produced. When the mixing ratio of the positive electrode conductive agent is set at 18 wt % or less, it is possible to impede the decomposition of the nonaqueous electrolyte on a surface of the positive electrode conductive agent during high-temperature storage. When the mixing ratio of the binder is set at 2 wt % or more, sufficient electrode strength is secured. When the mixing ratio of the binder is set at 17 wt % or less, a mixing ratio of an insulating material in the electrode is reduced, and its internal resistance is reduced.

The positive electrode current collector is preferably an aluminum foil or an aluminum alloy foil containing an element of Mg, Ti, Zn, Mn, Fe, Cu, Si or the like.

The positive electrode may be manufactured in the following manner: the positive electrode active material, the positive electrode conductive agent, and the binder are suspended in an appropriate solvent. Slurry thus formed by suspending process is applied to the positive electrode current collector and dried to form a positive electrode active material-containing layer on the surface of the positive electrode current collector. Then, the resultant material is pressed. Alternatively, the positive electrode active material, the positive electrode conductive agent and the binder are shaped into a pellet, and it may be used as a positive electrode active material-containing layer.

2) Negative Electrode

A negative electrode includes a negative electrode current collector, and a negative electrode active material-containing layer which is supported on one or both sides of the negative electrode current collector, and contains negative electrode active material, negative electrode conductive agent, and binder.

The negative electrode active material contains titanium-containing oxide. The titanium-containing oxide includes a titanium oxide and a metal oxide containing titanium as an essential metal component, i.e., titanium metal composite oxide.

Examples of the titanium-containing oxide are lithium-titanium oxide which contains lithium at the time of synthesizing an oxide, and titanium based oxide which does not contain the lithium at the time of synthesizing an oxide.

The lithium-titanium oxide may be lithium titanate having a spinel structure, e.g., $Li_{4+x}Ti_5O_{12}$ ($0 \leq x \leq 3$) or lithium titanate having a ramsdellite structure, e.g., $Li_{2+y}Ti_3O_7$ ($0 \leq y \leq 3$).

The titanium based oxide noted above includes, for example, $TiO_2$ and a metal composite oxide containing Ti and at least one element selected from the group consisting of P, V, Sn, Cu, Ni, Co and Fe. It is desirable for $TiO_2$ to be of anatase type and to have a low crystallinity caused by a heat treating temperature of 300 to 500° C. The metal composite oxide containing Ti and at least one element selected from the group consisting of P, V, Sn, Cu, Ni, Co and Fe includes, for example, $TiO_2$—$P_2O_5$, $TiO_2$—$V_2O_5$, $TiO_2$—$P_2O_5$—$SnO_2$, and $TiO_2$—$P_2O_5$—MeO (Me denoting at least one element selected from the group consisting of Cu, Ni, Co and Fe). To be more specific, it is desirable for the micro structure of the metal composite oxide to include a crystal phase and an amorphous phase or a single phase formed of an amorphous phase. The particular micro structure makes it possible to improve markedly the charge-discharge cycle performance of the nonaqueous electrolyte battery. Particularly, it is desirable to use lithium-titanium oxide and a metal composite oxide containing Ti and at least one element selected from the group consisting of P, V, Sn, Cu, Ni, Co and Fe.

Examples of the negative electrode conductive agent are acetylene black, carbon black and graphite.

The binder is able to bind the negative electrode active material to the negative electrode conductive agent. Examples of the binder are polytetrafluoroethylene (PTFE), polyvinylidene fluoride (PVdF), fluorine-based rubber, and styrene-butadiene rubber.

The mixing ratios of the negative electrode active material, the negative electrode conductive agent, and the binder are preferably 70 wt % or more to 96 wt % or less, 2 wt % or more to 28 wt % or less, and 2 wt % or more to 28 wt % or less, respectively. When the amount of the negative electrode conductive agent is less than 2 wt %, the current collector performance of the negative electrode degrades, and the large current performance of the nonaqueous electrolyte secondary battery degrades. When the amount of the binder is less than 2 wt %, a binding property between the negative electrode active material-containing layer and the negative electrode current collector degrades, and the cycle performance degrades. To ensure the increase of battery capacity, the negative electrode conductive agent and the binder are preferably each 28 wt % or less.

The negative electrode current collector is desirably made of a material which is electrochemically stable in a potential range, which is nobler than 1.0 V. Such a material is for example an aluminum foil or an aluminum alloy foil containing an element of Mg, Ti, Zn, Mn, Fe, Cu, Si or the like.

The negative electrode may be manufactured in the following manner: the negative electrode active material, the negative electrode conductive agent, and the binder are suspended in a solvent generally used. Slurry thus formed is applied to the negative electrode current collector and dried to form a negative electrode active material-containing layer on the surface of the negative electrode current collector. Then, the resultant material is pressed. Alternatively, the negative electrode active material, the negative electrode conductive agent and the binder are shaped into a pellet, and it may be used as a negative electrode active material-containing layer.

3) Nonaqueous Electrolyte

Examples of the nonaqueous electrolyte are a liquid nonaqueous electrolyte prepared by dissolving electrolyte into an organic solvent, and a gelatinous nonaqueous electrolyte formed by complexing the liquid nonaqueous electrolyte with polymer material.

The liquid nonaqueous electrolyte is prepared by dissolving electrolyte at concentration of 0.5 to 2.5 mol/L into an organic solvent.

The electrolyte may be lithium salt such as lithium perchlorate ($LiClO_4$), lithium hexafluorophosphate ($LiPF_6$), lithium tetrafluoroborate ($LiBF_4$), lithium hexafluoro arsenate ($LiAsF_6$), lithium trifluoro metasulfonate ($LiCF_3SO_3$), and bis-trifluoromethyl sulfonylimide lithium [$LiN(CF_3SO_2)_2$] or a mixture of them. A preferable material is hard to be oxidized even at high potential, and the most preferable material is $LiPF_6$.

The organic solvent may be cyclic carbonate, such as propylene carbonate (PC), ethylene carbonate (EC), and vinylene carbonate, chain carbonate, such as diethyl carbonate (DEC), dimethyl carbonate (DMC), and methylethyl carbonate (MEC), cyclic ether, such as tetrahydrofuran (THF), 2-methyltetrahydrofuran (2MeTHF) and dioxolane (DOX), chain ether such as dimethoxyethane (DME) and diethoxyethane (DEE), γ-butyrolactone (GBL), acetonitrile (AN), or sulfolane (SL), or a mixed solvent thereof.

The polymer material may be polyvinylidene fluoride (PVdF), polyacrylonitrile (PAN) and polyethylene oxide (PEO).

The nonaqueous electrolyte may be ionic liquid containing lithium ions, polymer solid electrolyte, an inorganic solid electrolyte or the like.

The ionic liquid is a chemical compound, which may exist as a liquid at normal temperature (15° C. to 25° C.), of the organic salt essentially consisting of a combination of organic cation and anion. The ionic liquid includes a salt being liquid when it is a single substance, a salt being liquefied when it is mixed with electrolyte, and a salt being liquefied when it is dissolved into an organic solvent. Generally, a melting point of the ionic liquid used for the nonaqueous electrolyte battery is 25° C. or lower. The organic cation has generally a quaternary ammonium skeleton.

The polymer solid electrolyte is prepared by dissolving electrolyte into polymer material, and solidifying the resultant material.

The inorganic solid electrolyte is a solid state material having a lithium ion conductivity.

4) Separator

Examples of the separators are porous film containing polyethylene, polypropylene, cellulose, or polyvinylidene fluoride (PVdF), and synthetic nonwoven fabric. The porous film containing polyethylene or polypropylene in particular melts at a fixed temperature to shut off current and hence, use thereof is preferable from the safety point of view.

5) Case

The case may be a container formed with a laminate film having a thickness of 0.2 mm or less, or a metal container having a thickness of 0.5 mm or less. A thickness of the metal container is preferably 0.2 mm or less.

The case may take various shapes, including flat, prismatic, cylindrical, coin, button, and sheet, and stacked shapes. As a matter of course, the case may be applied to micro batteries to be mounted to portable electronic devices, and large batteries carried on two- to four wheel motor vehicles.

A laminate film is a multi-layered film including a metal layer and a resin layer covering the metal layer. To reduce the weight, the metal layer is preferably an aluminum foil or an aluminum alloy foil. The resin layer is provided for reinforcing the metal layer, and made of polymer, such as polypropylene (PP), polyethylene (PE), nylon, polyethylene terephthalate (PET), or the like. The laminate film is formed by heat sealing.

The metal container is made of aluminum or aluminum alloy. The aluminum alloy is preferably an alloy containing an element, such as magnesium, zinc, or silicon. The content of the transitional metal, such as iron, copper, nickel, and chromium is 1% or less. As a result, long-term reliability and heat radiation property under high temperature condition are remarkably enhanced.

Figure 3:
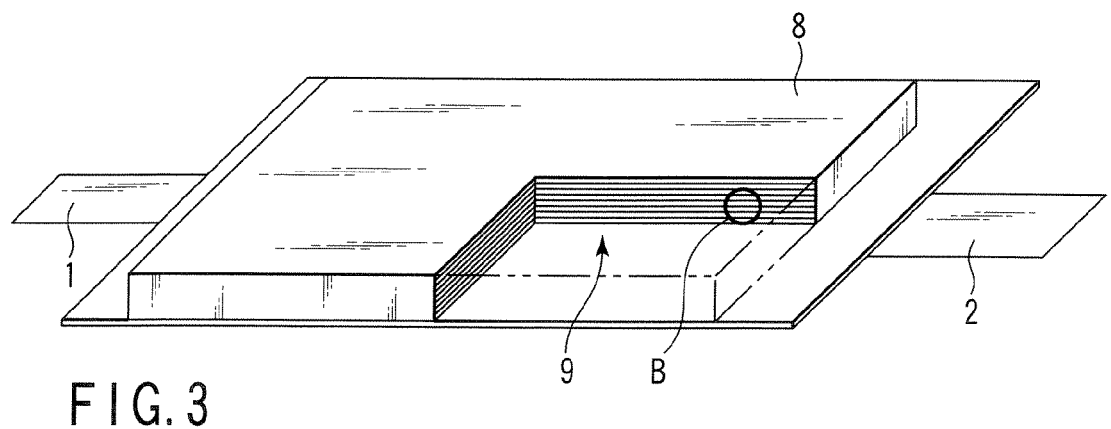
FIG. 3 is a partially cutaway view perspectively showing another type of the flat type nonaqueous electrolyte secondary battery according to the first embodiment.
Figure 4:
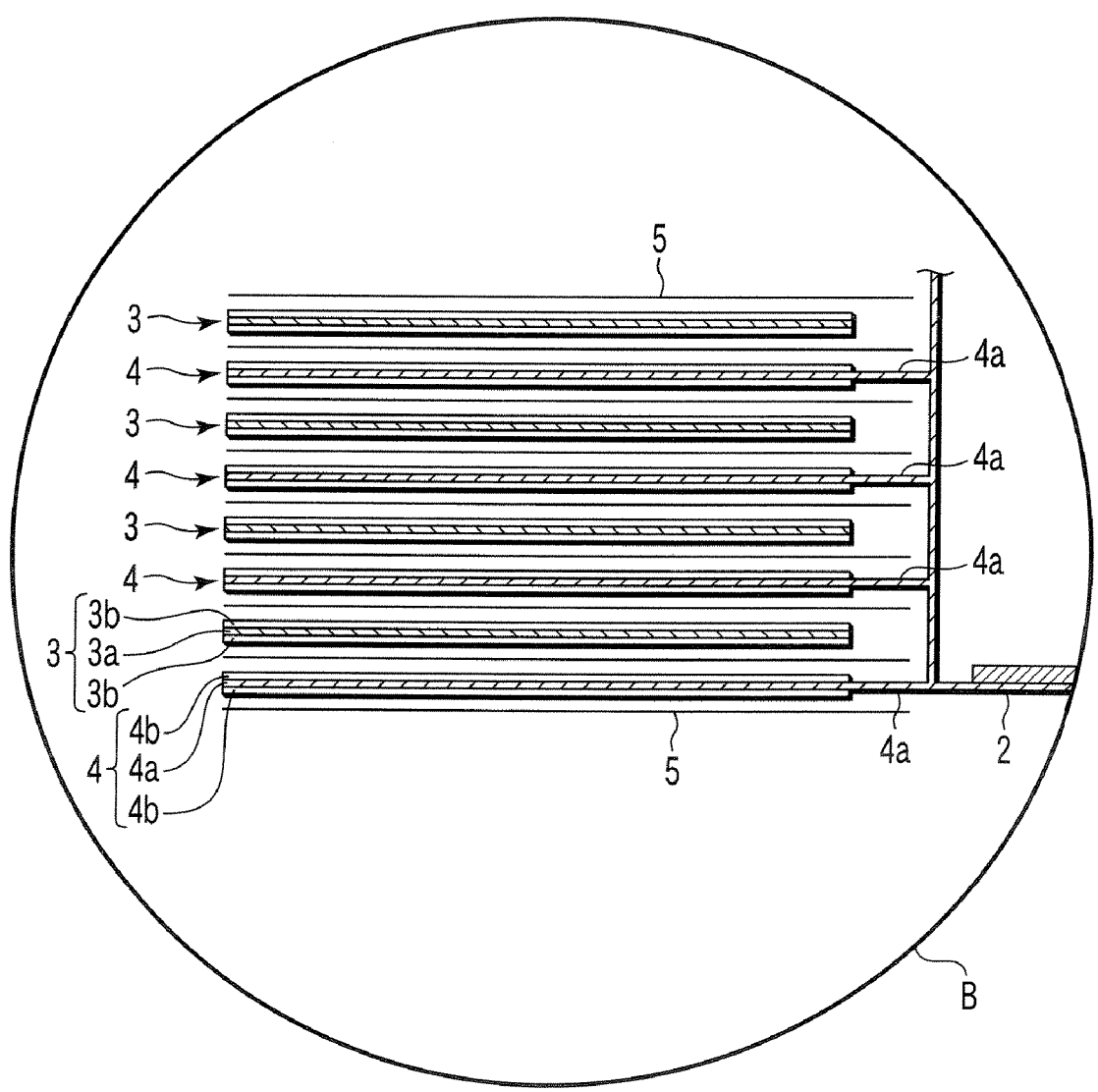
FIG. 4 is an enlarged cross sectional view of a portion B in FIG. 3.

The nonaqueous electrolyte battery of the first embodiment may be constructed as shown in FIGS. 3 and 4, in addition to the construction shown in FIGS. 1 and 2.

As shown in FIG. 3, a stack type electrode group 9 is housed in a case 8 formed of a laminate film. As shown in FIG. 4, the stack type electrode group 9 is constructed such that a positive electrode 3 and a negative electrode 4 are stacked one upon the other a plurality of times alternately with a separator 5 interposed between the positive electrode 3 and the negative electrode 4. The electrode group 9 includes a plurality of the positive electrode 3 each comprising a positive electrode current collector 3a and positive electrode active material-containing layers 3b supported on both surfaces of the positive electrode current collector 3a. The electrode group 9 also includes a plurality of the negative electrode 4 each comprising a negative electrode current collector 4a and negative electrode active material-containing layers 4b supported on both surfaces of the negative electrode current collector 4a. One side of the negative electrode current collector 4a included in the negative electrode 4 protrudes from the positive electrode 3. The negative electrode current collector 4a protruding from the positive electrode 3 is electrically connected to a band-like negative electrode terminal 2. The tip portion of the band-like negative electrode terminal 2 is drawn to the outside from the case 8. Also, that side of the positive electrode current collector 3a included in the positive electrode 3 which is positioned on the side opposite to the protruding side of the negative electrode current collector 4a, though the protruding side of the positive electrode current collector 3a is not shown in the drawing. The positive electrode current collector 3a protruding from the negative electrode 4 is electrically connected to a band-like positive electrode terminal 1. The tip portion of the band-like positive electrode terminal 1 is positioned on the side opposite to the side of the negative electrode terminal 2 and is drawn to the outside from a side of case 8.

Second Embodiment

A battery pack according to a second embodiment includes a plurality of unit cells according to the first embodiment. Those unit cells are arranged electrically in series or parallel to form a battery module.

Generally, in the case of the battery module, when it is repeatedly charged and discharged, a variation occurs in the capacities of the individual unit cells. As a result, some of unit cells in the battery module tend to be in an over-discharging state. As described above, the unit cell according to the first embodiment is constructed such that the positive electrode is hard to be put in an over-discharging state. Therefore, deterioration of the unit cell owing to the over discharging is less, and the battery module deterioration is also lessened.

It is possible to use the flattened type nonaqueous electrolyte secondary battery shown in FIG. 1 or FIG. 3 as the unit cell included in the battery module.

Figure 5:
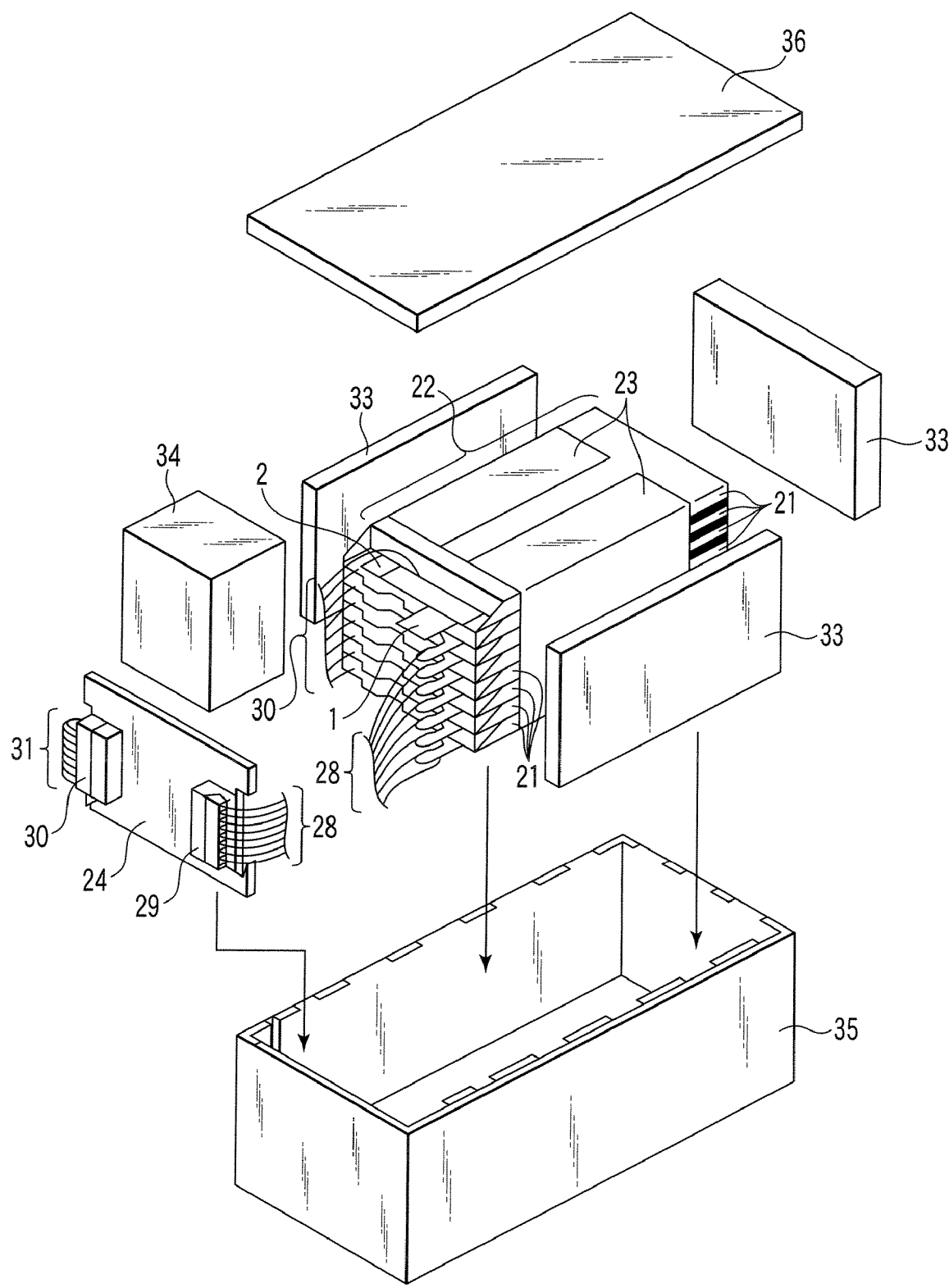
FIG. 5 is an exploded perspective view showing a battery pack according to a second embodiment.
Figure 6:
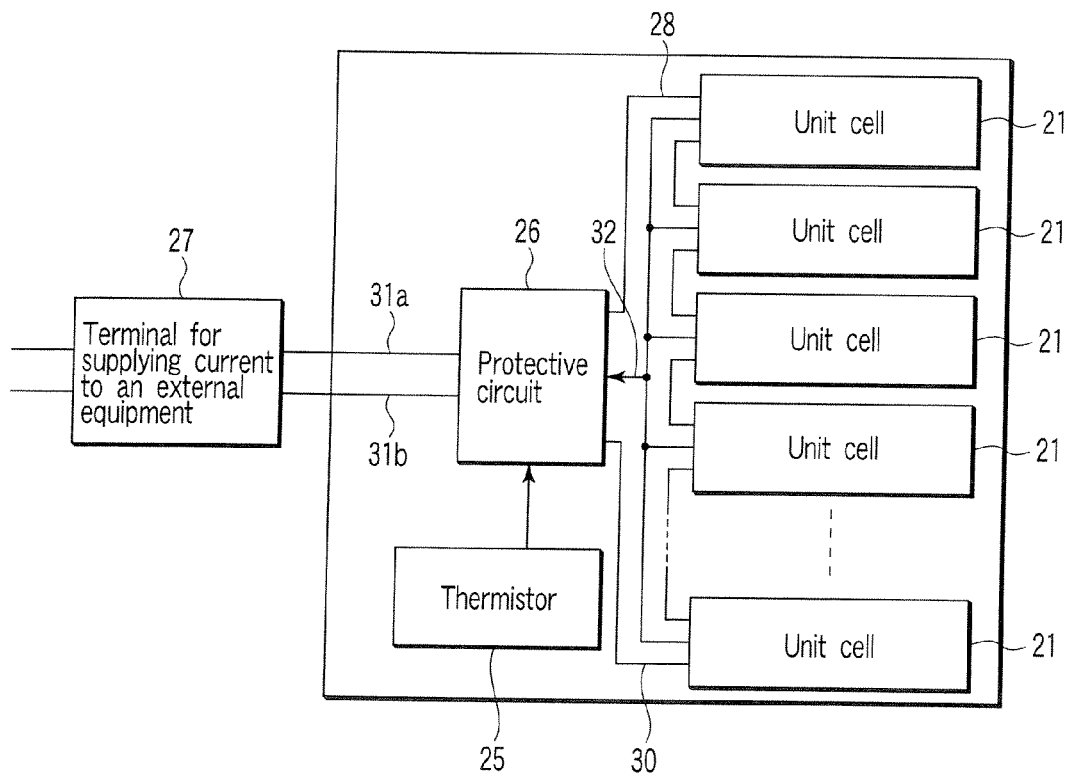
FIG. 6 is a block diagram showing an electrical circuit of the battery pack of FIG. 5.

Each of unit cells 21 included in the battery pack shown in FIG. 5 is formed of a flattened type nonaqueous electrolyte battery constructed as shown in FIG. 1. The plural unit cells 21 are stacked one upon the other in the thickness direction in a manner to align the protruding directions of the positive electrode terminals 1 and the negative electrode terminals 2. As shown in FIG. 6, the unit cells 21 are connected in series to form a battery module 22. The unit cells 21 forming the battery module 22 are made integral by using an adhesive tape 23 as shown in FIG. 5.

A printed wiring board 24 is arranged on the side surface of the battery module 22 toward which protrude the positive electrode terminals 1 and the negative electrode terminals 2. As shown in FIG. 6, a thermistor 25, a protective circuit 26 and a terminal 27 for current supply to the external equipment are connected to the printed wiring board 24.

As shown in FIGS. 5 and 6, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26.

The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a set temperature, and that the over-charging, over-discharging and over-current of the unit cell 21 have been detected. FIG. 5 covers the case of applying the detection to the individual unit cells 21. However, it is also possible to apply the detection to the battery module 22. In the case of detecting the unit cells 21, it is possible to detect the battery voltage, the positive electrode potential or the negative electrode potential. Incidentally, in the case of detecting the electrode potential, a lithium electrode used as a reference electrode is inserted into the unit cell 21. In the case of FIG. 6, a wiring 32 is connected to each of the unit cells 21 for detecting the voltage, and the detection signal is transmitted through these wirings 32 to the protective circuit 26.

The battery pack according to the second embodiment is capable of accurately controlling a positive electrode potential or a negative electrode potential upon detection of a battery voltage. In this respect, the battery pack is well suitable for use of a protecting circuit for detecting only the battery voltage.

Protective sheets 33 each formed of rubber or resin may be arranged on the three of the four sides of the battery module 22, though the protective sheet 33 is not arranged on the side toward which protrude the positive electrode terminals 1 and the negative electrode terminals 2. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk to fix the battery module 22.

The unit cells 21 shown in FIGS. 5 and 6 are connected in series. However, it is also possible to connect the unit cells 21 in parallel to increase the cell capacity. Of course, it is possible to connect the battery packs in series or in parallel.

Also, the embodiments of the battery pack can be changed appropriately depending on the use of the battery pack.

When the amorphous $FePO_4$ is used for the second positive electrode active material, applications of the battery pack of the second embodiment where the discharge load performance is required are preferable. Specific applications are power sources for digital cameras, hybrid electric cars of two to four wheels, electric vehicles of two to four wheels, and motor assist bicycles. Particularly, the vehicle-carried power sources are preferable as its applications.

Examples of the invention will be described hereunder. It should be understood that the invention is not limited to those examples, as long as it is within the spirit and scope of the invention.

<Cycle Test>

Example 1

$LiCoO_2$ was used for the first positive electrode active material, and amorphous $FePO_4$ was used for the second positive electrode active material. A ratio of the second positive electrode active material to the first positive electrode active material was 5 wt %. The first and the second positive electrode active materials, the conductive agent, and the binder were suspended into an organic solvent, to thereby prepare slurry. The slurry prepared was applied to an aluminum current collector and dried to form a positive electrode. Those substances were suspended in the following way: when the total weight of the first positive electrode active material and the second positive electrode active material was 85, the weights of acetylene black and graphite as the conductive agent were 5 and 5, respectively, and the weight of polyvinylidene fluoride as the binder was 5.

Lithium-titanium oxide having a spinel structure, represented by $Li_4Ti_5O_{12}$ was prepared for the negative electrode active material. Negative electrode active material, graphite as conductive agent, and polyvinylidene fluoride as binder were suspended, at 85:10:5 by weight ratio, into an organic solvent to thereby prepare a slurry. The resultant slurry was applied to an aluminum current collector, and dried to form a negative electrode.

A separator of polyethylene porous film of 12 μm in thickness was brought into close contact with the positive electrode to cover the latter. The negative electrode was oppositely superposed on the positive electrode in a state that the separator is interposed therebetween, and the resultant material was wound to form an electrode group. The electrode group was pressed to be flat. The electrode group formed was housed in a container formed with an aluminum containing laminated film of 0.1 mm in thickness.

A liquid nonaqueous electrolyte was prepared in a manner that lithium tetrafluoroborate ($LiBF_4$) as electrolyte of 2.0 mol/L was dissolved into a mixed solvent of ethylene carbonate (EC) and γ-butyrolactone (BL) (25:75 by volume ratio). The nonaqueous electrolyte was poured into the electrode group within the container, to thereby form a thin type nonaqueous electrolyte battery having the structure shown in FIG. 1, and having dimensions of 3.8 mm thick, 35 mm wide, and 63 mm high.

A charging/discharging operations of the nonaqueous electrolyte battery was repeated 500 times under conditions that the charging voltage thereof is 2.8 V, the discharge cutoff voltage is 1.5 V, and ambient temperature is 45° C. A discharge capacity maintenance rate was calculated in a manner that a discharge capacity in the 500th charging/discharging operation is divided by a discharge capacity in the first charging/discharging operation, and the result is multiplied by 100. The discharge capacity maintenance rates obtained are tabulated in Table 1.

Examples 2 to 10 and comparative examples 1 to 4

Oxides shown in Table 1 were used for the first positive electrode active material and the second positive electrode active material. Except this, those examples and comparative examples were substantially the same as Example 1. Test results are also tabulated in Table 1.

The amorphous $FePO_4$ was synthesized by heating iron phosphates hydrate at 400° C. for 12 hours. The amorphous $FePO_4$ having a hexagonal structure was synthesized by heating iron phosphates hydrate at 600° C. for 12 hours.

TABLE 1

| | First positive electrode active material | Second positive electrode active material | Negative electrode active material | Discharge capacity maintenance rate (%) at the 500th charging/discharging operation |
|---|---|---|---|---|
| Example 1 | $LiCoO_2$ | Amorphous - $FePO_4$ | $Li_4Ti_5O_{12}$ | 79 |
| Comparative Example 1 | $LiCoO_2$ | None | $Li_4Ti_5O_{12}$ | 68 |
| Example 2 | $LiNi_{0.8}Co_{0.17}Al_{0.03}O_2$ | Amorphous - $FePO_4$ | $Li_4Ti_5O_{12}$ | 85 |
| Comparative Example 2 | $LiNi_{0.8}Co_{0.17}Al_{0.03}O_2$ | None | $Li_4Ti_5O_{12}$ | 58 |
| Example 3 | $LiMn_{1/3}Ni_{1/3}Co_{1/3}O_2$ | Amorphous - $FePO_4$ | $Li_4Ti_5O_{12}$ | 83 |
| Example 4 | $LiMn_{1/3}Ni_{1/3}Co_{1/3}O_2$ | $Li_3Fe_2(PO_4)_3$ | $Li_4Ti_5O_{12}$ | 78 |
| Example 5 | $LiMn_{1/3}Ni_{1/3}Co_{1/3}O_2$ | $LiFeP_2O_7$ | $Li_4Ti_5O_{12}$ | 77 |
| Example 6 | $LiMn_{1/3}Ni_{1/3}Co_{1/3}O_2$ | $Fe_4(P_2O_7)_3$ | $Li_4Ti_5O_{12}$ | 77 |
| Example 7 | $LiMn_{1/3}Ni_{1/3}Co_{1/3}O_2$ | $Fe_2(SO_4)_3$ | $Li_4Ti_5O_{12}$ | 75 |
| Example 8 | $LiMn_{1/3}Ni_{1/3}Co_{1/3}O_2$ | $V_2O_5$ | $Li_4Ti_5O_{12}$ | 79 |
| Example 9 | $LiMn_{1/3}Ni_{1/3}Co_{1/3}O_2$ | hexagonal - $FePO_4$ | $Li_4Ti_5O_{12}$ | 80 |
| Comparative Example 3 | $LiMn_{1/3}Ni_{1/3}Co_{1/3}O_2$ | None | $Li_4Ti_5O_{12}$ | 61 |
| Example 10 | $Li_{1.02}Mn_{1.9}Mg_{0.08}O_4$ | Amorphous - $FePO_4$ | $Li_4Ti_5O_{12}$ | 65 |
| Comparative Example 4 | $Li_{1.02}Mn_{1.9}Mg_{0.08}O_4$ | None | $Li_4Ti_5O_{12}$ | 54 |

As shown in Table 1, the discharge capacity in the 500th charging/discharging operation of Example 1 is higher than that of Comparative Example 1. From this, it is seen that the cycle performance of the nonaqueous electrolyte battery of the embodiment is excellent. The same thing is seen from comparisons of Example 2 and Comparative Example 2, Examples 3 to 9 and Comparative Example 3, and Example 10 and Comparative Example 4.

The discharge capacity in the 500th charging/discharging operation is especially excellent in Example 2 compared to Comparative Example 2, and in Examples 3 to 9 compared to Comparative Example 3. Accordingly, it is seen that the cycle performance is especially excellent when $LiNi_{0.8}Co_{0.17}Al_{0.03}O_2$ or $LiMn_{1/3}Ni_{1/3}Co_{1/3}O_2$ is used for the first positive electrode active material. It is guessed that this is due to the fact that the initial discharge efficiency is relatively low.

Examples 11 to 14

Ratios of the second positive electrode active material to the first positive electrode active material were set as shown in Table 2. Except this, those examples are substantially the same as Example 3. The test results are shown in Table 2.

In Table 2, increasing rates of the battery weights of Example 3 and Examples 11 to 14 are shown with respect to Comparative Example 3. From the figures, it is seen that the mixing of the second positive electrode active material to the positive electrode causes increase of the battery weight.

Let us compare Example 13 where the ratio of the second positive electrode active material is 10 wt % with Example 14 where it is 20 wt %. It is seen that in Example 14, increase of the discharge capacity maintenance rate is small, but increase of the battery weight is large. From the viewpoint of energy density increase, it is therefore preferable that the ratio of the second positive electrode active material to the first positive electrode active material is 10 wt % or less.

<Measurement of Initial Charge/Discharge Efficiency>

The initial charge/discharge efficiency of $LiCoO_2$ used for the first positive electrode active material in Example 1 and Comparative Example 1 was measured.

$LiCoO_2$ was used for the positive electrode active material. The positive electrode active material, the conductive agent, and the binder were suspended into an organic solvent, to thereby prepare a slurry. The slurry prepared was applied to

TABLE 2

| | First positive electrode active material | Second positive electrode active material | Weight percentage (%) of second positive electrode active material to first positive electrode active material | Increasing rate of battery weight (%) | Discharge capacity maintenance rate (%) at the 500th charging/discharging operation |
|---|---|---|---|---|---|
| Comparative Example 3 | $LiMn_{1/3}Ni_{1/3}Co_{1/3}O_2$ | None | 0 | 0 | 61 |
| Example 11 | $LiMn_{1/3}Ni_{1/3}Co_{1/3}O_2$ | Amorphous - $FePO_4$ | 0.1 | 0.04 | 66 |
| Example 12 | $LiMn_{1/3}Ni_{1/3}Co_{1/3}O_2$ | Amorphous - $FePO_4$ | 1 | 0.35 | 75 |
| Example 3 | $LiMn_{1/3}Ni_{1/3}Co_{1/3}O_2$ | Amorphous - $FePO_4$ | 5 | 1.8 | 83 |
| Example 13 | $LiMn_{1/3}Ni_{1/3}Co_{1/3}O_2$ | Amorphous - $FePO_4$ | 10 | 3.5 | 85 |
| Example 14 | $LiMn_{1/3}Ni_{1/3}Co_{1/3}O_2$ | Amorphous - $FePO_4$ | 20 | 7 | 87 |

As shown in Table 2, the discharge capacity in the 500th charging/discharging operation of Example 11 is higher than that of Comparative Example 3. From this, it is seen that the cycle performance is enhanced by setting the ratio of the second positive electrode active material to the first positive electrode active material at 0.1 wt % or more.

an aluminum current collector and dried to form a positive electrode. In suspending those substances, when the weight of the positive electrode active material is 85, the weights of acetylene black and graphite as the conductive agent were 5 and 5, respectively, and the weight of polyvinylidene fluoride as the binder was 5.

Li metal was used for the negative electrode. A positive electrode and a negative electrode were each cut out in the form of a disc of 16 mm in diameter. The positive electrode, the negative electrode, the separator and electrolyte solution were sealed into a coin type cell (20 mm in diameter and 1.6 mm in height). The cell was initially charged at 25° C. The initial charging operation was performed at 30 mA/1 g of the positive electrode active material up to cell voltage 4.2 V, and then the cell was charged at constant voltage of 4.2 V. The total charging time was 10 hours. Then, the circuit was opened for 15 minutes. Following this, the initial discharging operation was performed at 30 mA/1 g of the positive electrode active material up to cell voltage of 3.0 V. Let the initial charge capacity and the initial discharge capacity be Q1 and Q2, respectively. The initial charge/discharge efficiency E (%) was calculated by using the following equation (I).

$$E = Q2/Q1 \times 100 \qquad (I)$$

The initial charge/discharge efficiency E (%) thus calculated was 95%.

The initial charge/discharge efficiency of $LiNi_{0.8}Co_{0.17}Al_{0.03}O_2$ used for the first positive electrode active material in Example 2 and Comparative Example 2 was measured.

A positive electrode was manufactured as in the case of $LiCoO_2$ except that $LiNi_{0.8}Co_{0.17}Al_{0.03}O_2$ was used for the positive electrode active material. Li metal was used for the negative electrode. The positive electrode and the negative electrode were each cut out in the form of a disc of 16 mm in diameter. The positive electrode, the negative electrode, the separator and electrolyte solution were sealed into a coin type cell (20 mm in diameter and 1.6 mm in height). The cell was initially charged at 25° C. The initial charging operation was performed at 40 mA/1 g of the positive electrode active material up to cell voltage 4.2 V, and then the cell was charged at constant voltage of 4.2 V. The total charging time was 10 hours. Then, the circuit was opened for 15 minutes. Following this, the initial discharging operation was performed at 40 mA/1 g of the positive electrode active material up to cell voltage of 2.8 V. Let the initial charge capacity and the initial discharge capacity be Q1 and Q2, respectively. The initial charge/discharge efficiency E (%) was calculated by using the equation (I). The initial charge/discharge efficiency E (%) thus calculated was 87%.

The initial charge/discharge efficiency of $LiMn_{1/3}Ni_{1/3}Co_{1/3}O_2$ used for the first positive electrode active material in Examples 3 to 9 and Comparative Example 3 was measured.

A positive electrode was manufactured as in the case of $LiCoO_2$ except that $LiMn_{1/3}Ni_{1/3}Co_{1/3}O_2$ was used for the positive electrode active material. Li metal was used for the negative electrode. The positive electrode and the negative electrode were each cut out in the form of a disc of 16 mm in diameter. The positive electrode, the negative electrode, the separator and electrolyte solution were sealed into a coin type cell (20 mm in diameter and 1.6 mm in height). The cell was initially charged at 25° C. The initial charging operation was performed at 30 mA/1 g of the positive electrode active material up to cell voltage 4.2 V, and then the cell was charged at constant voltage of 4.2 V. The total charging time was 10 hours. Then, the circuit was opened for 15 minutes. Following this, the initial discharging operation was performed at 30 mA/1 g of the positive electrode active material up to cell voltage of 2.8 V. Let the initial charge capacity and the initial discharge capacity be Q1 and Q2, respectively. The initial charge/discharge efficiency E (%) was calculated by using the equation (I). The initial charge/discharge efficiency E thus calculated was 89%.

The initial charge/discharge efficiency of $Li_{1.02}Mn_{1.9}Mg_{0.8}O_4$ used for the first positive electrode active material in Example 10 and Comparative Example 4 was measured.

A positive electrode was manufactured as in the case of $LiCoO_2$ except that $Li_{1.02}Mn_{1.9}Mg_{0.8}O_4$ was used for the positive electrode active material. Li metal was used for the negative electrode. The positive electrode and the negative electrode were each cut out in the form of a disc of 16 mm in diameter. The positive electrode, the negative electrode, the separator and electrolyte solution were sealed into a coin type cell (20 mm in diameter and 1.6 mm in height). The cell was initially charged at 25° C. The initial charging operation was performed at 20 mA/1 g of the positive electrode active material up to cell voltage of 4.2 V, and then the cell was charged at constant voltage of 4.2 V. The total charging time was 10 hours. Then, the circuit was opened for 15 minutes. Following this, the initial discharging operation was performed at 20 mA/1 g of the positive electrode active material up to 3.0 V. Let the initial charge capacity and the initial discharge capacity be Q1 and Q2, respectively. The initial charge/discharge efficiency E (%) was calculated by using the equation (I). The initial charge/discharge efficiency E thus calculated was 95%.

The initial charge/discharge efficiency of $Li_4Ti_5O_{12}$ used for the negative electrode active material in Examples and Comparative Examples was measured.

An electrode was manufactured as in Examples and Comparative Example 1. Li metal was used for the counter electrode. The electrode and the counter electrode were each cut out in the form of a disc of 16 mm in diameter. The electrode, the counter electrode, the separator and electrolyte solution were sealed into a coin type cell (20 mm in diameter and 1.6 mm in height). The cell was initially charged at 25° C. The initial charging operation was performed at 30 mA/1 g of the positive electrode active material up to cell voltage of 1.5 V, and then the cell was charged at constant voltage of 1.5 V. The total charging time was 10 hours. Then, the circuit was opened for 15 minutes. Following this, the initial discharging operation was performed at 30 mA/1 g of the positive electrode active material up to cell voltage of 2.0 V. Let the initial charge capacity and the initial discharge capacity be Q1 and Q2, respectively. The initial charge/discharge efficiency E (%) was calculated by using the equation (I). The initial charge/discharge efficiency E thus calculated was 95%.

As seen from the above description, $E_1 \geqq E_2$ holds for the initial charge/discharge efficiency. $E_1$ is the initial charge/discharge efficiency of the titanium-containing oxide, and $E_2$ is the initial charge/discharge efficiency of the lithium-transition metal composite oxide.

Further, it is seen that the initial charge/discharge efficiency of $LiNi_{0.8}Co_{0.17}Al_{0.03}O_2$ is lower than that of $Li_4Ti_5O_{12}$ and the initial charge/discharge efficiency of $LiMn_{1/3}Ni_{1/3}Co_{1/3}O_2$ is lower than that of $Li_4Ti_5O_{12}$. It is guessed that because of such initial charge/discharge efficiency relationship, the addition of the second positive electrode active material would cause Examples 2 and 3 to exhibit excellent cycle performance.

<Method of Measuring Weight Percentage of First and Second Positive Electrode Active Materials>

A weight ratio of the first and the second positive electrode active materials is measured in a state that the battery is charged.

A method of measuring a weight percentage of the first and the second positive electrode active materials will be described below. After the conductive agent and the binder are removed from the positive electrode by heat treatment and the like, those mixtures are sorted, and then the weights of the first positive electrode active material and the second positive electrode active material are measured.

In the case where it is difficult to sort the mixture, an XRD measurement, for example, is used to exactly identify the substances contained in the positive electrode. Then, the weights of major elements of the substances forming the mixture is measured by using an atomic absorption analysis. For example, Co as a major element of the first positive electrode active material of $LiCoO_2$ and Fe as a major element of the second positive electrode active material of $FePO_4$ are measured in terms of weight ratio. By converting the obtained weight ratio into a compound weight ratio, a weight percentage of the first positive electrode active material to the second positive electrode active material is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery comprising:
a negative electrode comprising lithium titanate having a spinel structure;
a positive electrode comprising a lithium-transition metal composite oxide being one selected from the group consisting of $LiNi_{0.8}Co_{0.17}Al_{0.03}O_2$ and $Li_{1.02}Mn_{1.9}Mg_{0.08}O_4$, and $FePO_4$, wherein a ratio of $FePO_4$:lithium-transition metal composite oxide in weight percent is in the range of 0.1:100 to 10:100; and
a nonaqueous electrolyte.

2. The battery according to claim 1, wherein the ratio of $FePO_4$:lithium-transition metal composite oxide in weight percent is in the range of 1:100 to 10:100.

3. The battery according to claim 1, wherein the ratio of $FePO_4$:lithium-transition metal composite oxide in weight percent is in the range of 1:100 to 5:100.

4. The battery according to claim 1, wherein $FePO_4$ is amorphous or has a hexagonal structure.

5. A battery pack comprising nonaqueous electrolyte batteries, wherein
the nonaqueous electrolyte batteries comprise:
a negative electrode comprising lithium titanate having a spinel structure;
a positive electrode comprising a lithium-transition metal composite oxide being one selected from the group consisting of $LiNi_{0.8}Co_{0.17}Al_{0.03}O_2$ and $Li_{1.02}Mn_{1.9}Mg_{0.08}O_4$, and $FePO_4$, wherein a ratio of $FePO_4$:lithium-transition metal composite oxide in weight percent is in the range of 0.1:100 to 10:100; and
a nonaqueous electrolyte.

6. The battery pack according to claim 5, wherein $FePO_4$ is amorphous or has a hexagonal structure.

7. A vehicle comprising the battery pack according to claim 5.

8. The nonaqueous electrolyte battery according to claim 1, wherein the ratio of $FePO_4$:lithium-transition metal composite oxide in weight percent is in the range of 5:100 to 10:100.

9. The battery pack according to claim 5, wherein the ratio of $FePO_4$:lithium-transition metal composite oxide in weight percent is in the range of 5:100 to 10:100.

* * * * *